Jan. 4, 1949.    W. A. HAGERBAUMER    2,458,162
METHOD AND APPARATUS FOR CONVERSION OF LIQUID
HYDROCARBONS WITH A MOVING CATALYST
Filed Nov. 14, 1946    3 Sheets—Sheet 3
Fig. 3,
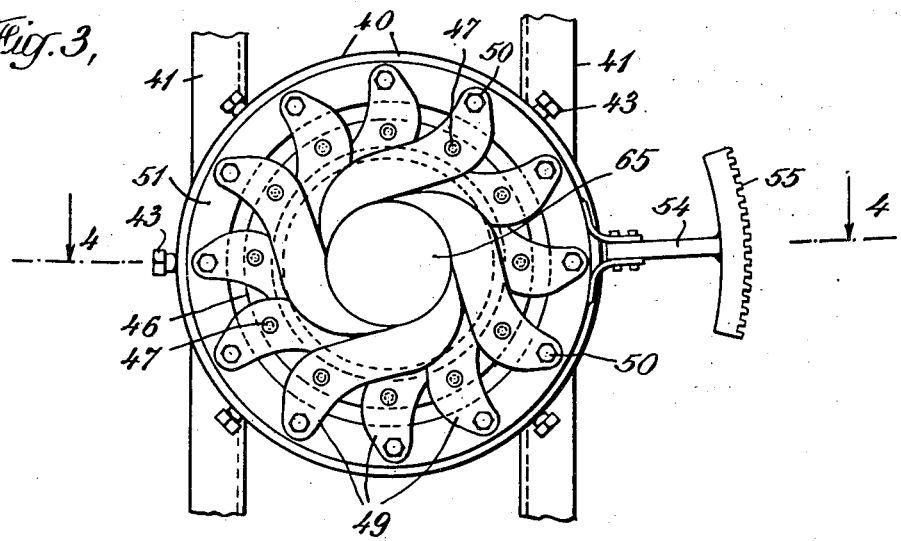
Fig. 4,
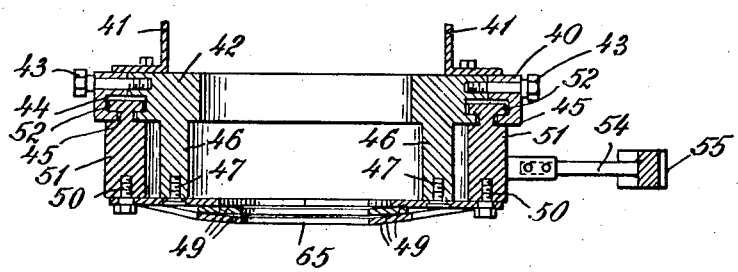
Fig. 5.
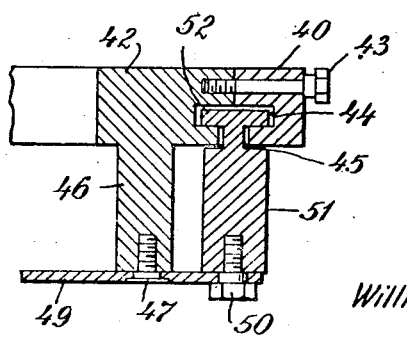
INVENTOR
William A. Hagerbaumer
BY
John A. Crowley, Jr.
AGENT OR ATTORNEY Patented Jan. 4, 1949

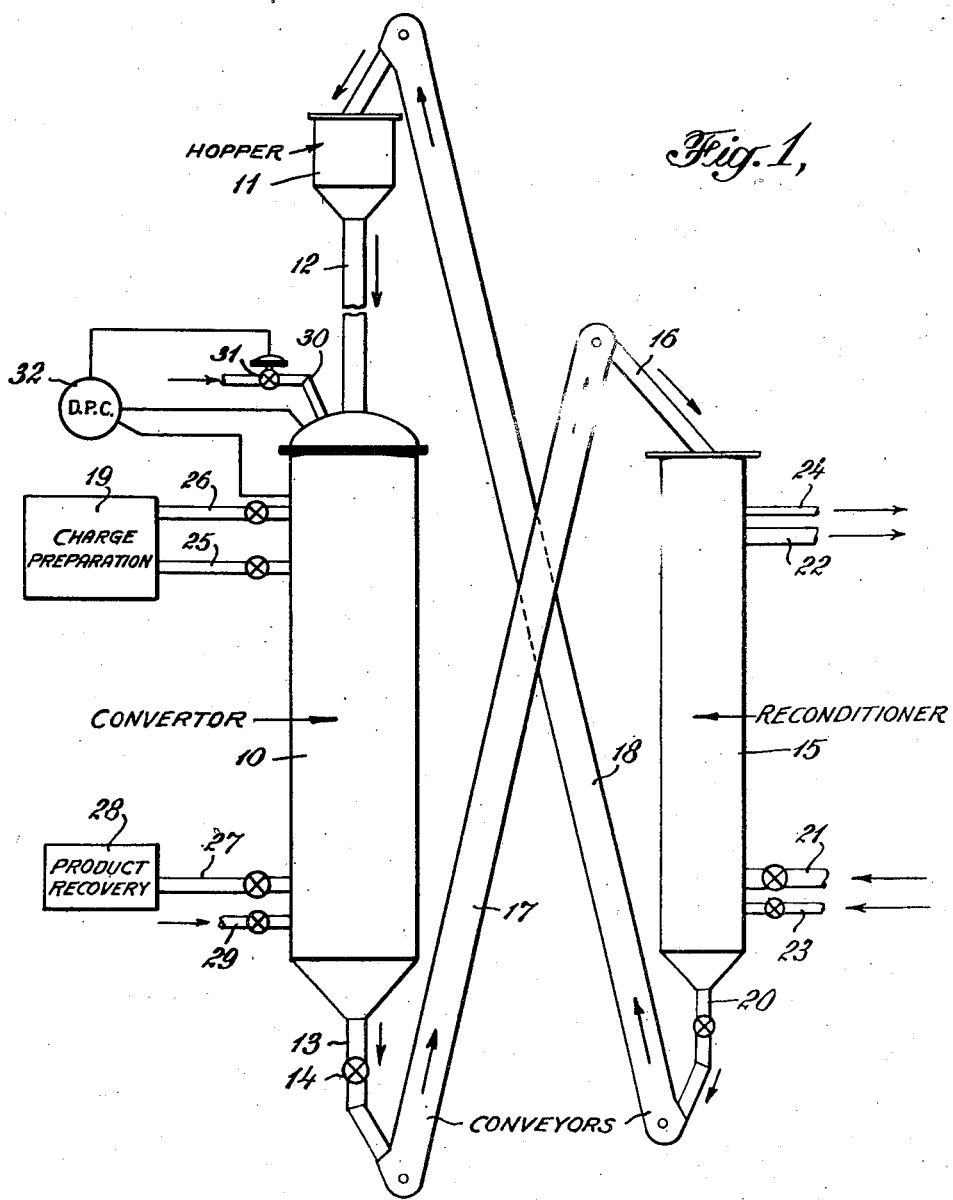

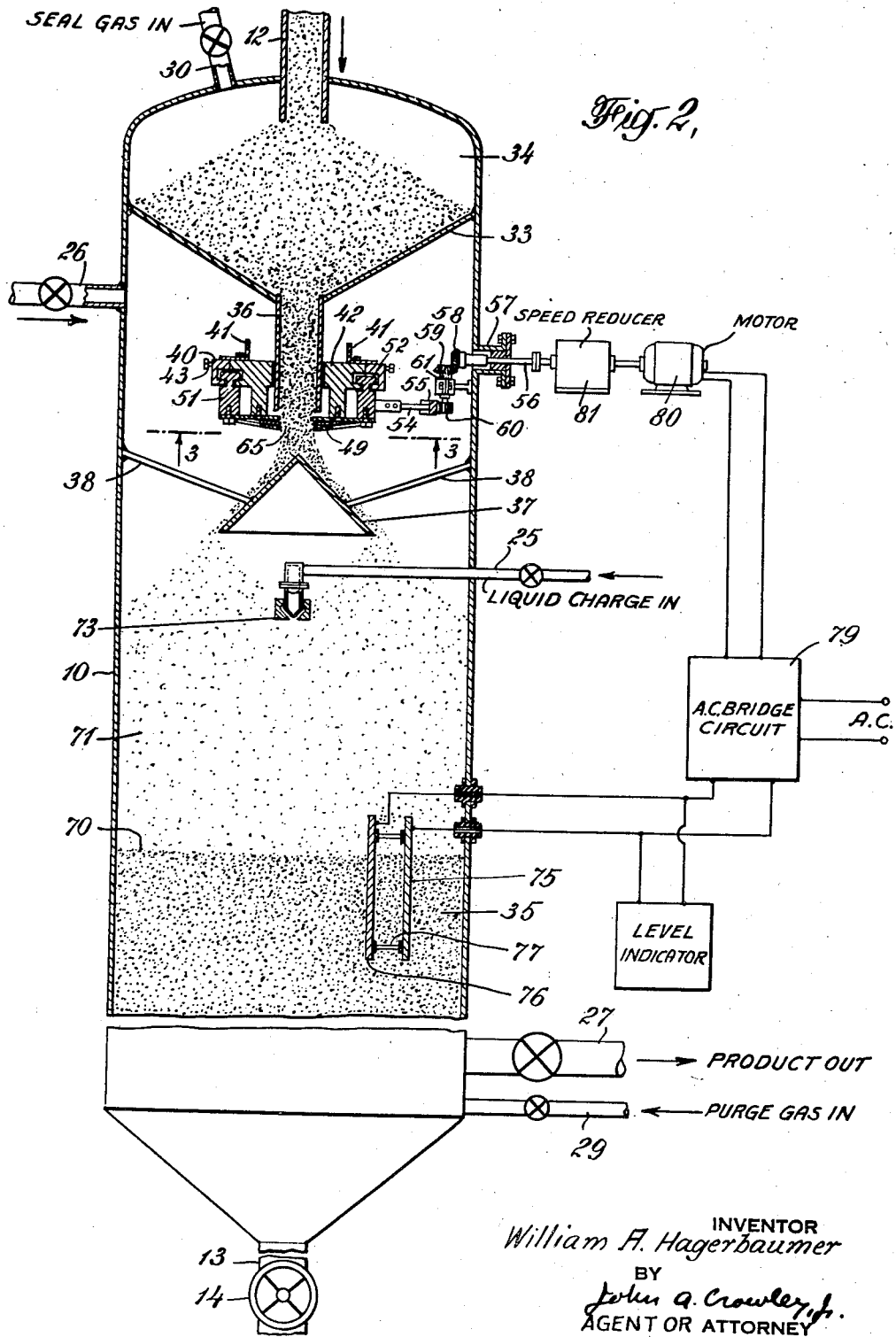

2,458,162

UNITED STATES PATENT OFFICE 2,458,162

METHOD AND APPARATUS FOR CONVERSION OF LIQUID HYDROCARBONS WITH A MOVING CATALYST

William A. Hagerbaumer, Westfield, N. J., assignor to Socony-Vacuum Oil Company, Incorporated, a corporation of New York Application November 14, 1946, Serial No. 709,874

11 Claims. (Cl. 196—52)

This invention has to do with a method and apparatus for conversion of high boiling liquid hydrocarbons or mixed phase hydrocarbons to lower boiling hydrocarbons in the presence of a moving particle-form contact mass material which may or may not exhibit catalytic properties with respect to the conversion reaction. Typical of such processes is the catalytic conversion of heated liquid hydrocarbons to lower boiling gasoline containing gaseous products by the contacting of a high boiling liquid charge at temperatures of the order of 850° F. and upwards with a particle-form adsorbent catalytic material. Other exemplary processes are the thermal visbreaking, coking or cracking of liquid or mixed phase hydrocarbon charge by contact with heated particle-form inert contact materials.

This invention has specifically to do with conversion processes wherein the contact material is passed cyclically through a conversion zone wherein it flows as a substantially compact stream while being contacted with hydrocarbons to effect their conversion and through a regeneration or reconditioning zone wherein it is contacted with a suitable gas to condition it for reuse in said conversion zone.

In such processes wherein the contact material is catalytic in nature it may partake of the nature of natural or treated clays, bauxite, activated alumina or synthetic associations of silica, alumina or silica and alumina to which other substances such as certain metallic oxides may be added in small amounts for specific purposes. When the contact material is inert in character it may partake of the form of refractory materials such as zirkite, corhart material, or mullite or it may partake of the form of stones or metallic particles or balls. In order to insure practical capacity for gas flow through the compact mass of contact material particles in the conversion and regeneration zones, it has been found desirable to maintain the contact material particles within the size range about 3 to 100 mesh and preferably within the range about 4 to 20 mesh by Tyler standard screen analysis. While operation may be obtained using contact material particles of a size outside these ranges, the resulting operation is inferior.

A specific object of this invention is the provision in a hydrocarbon conversion process wherein a liquid hydrocarbon charge is passed downwardly within a substantially compact column downwardly moving of contact material particles of an improved method and apparatus for supply of contact material to said column and for control of the surface level of said column within the conversion zone.

These and other objects of this invention will become apparent from the following discussion of the invention.

Before proceeding with this discussion certain terms used in describing and in claiming this invention will be defined. The term "gaseous" as used herein is intended to refer to a material existing in the gaseous phase under the particular operating conditions of pressure and temperature involved regardless of what may be the normal phase of that material under ordinary atmospheric conditions. The expression "contact material" is employed herein in a broad sense as covering solid particles which are suitable as a contacting or heat carrying agent for the particular conversion involved regardless of whether such solid particles exhibit a catalytic effect toward the conversion or not.

The invention may be best understood by reference to the drawings attached hereto, of which Figure 1 is an elevational view showing the general arrangement of a continuous hydrocarbon conversion system of the type to which this invention may be applied;

Figure 2 is an elevational view, partially in section, showing the application of this invention to the convertor vessel;

Figure 3 is a plan view looking up from line 3—3 in Figure 2 showing details of the flow throttling device employed in the apparatus of Figure 2;

Figure 4 is a sectional view taken along line 3—3 of Figure 3; and

Figure 5 is an enlarged detail view of a portion of the apparatus shown in Figure 4.

All of these drawings are highly diagrammatic in form.

Turning now to Figure 1 there is shown a convertor 10, supplied by contact material from a supply hopper 11 through a gravity feed leg 12 and provided with a contact material drain leg 13 bearing flow control valve 14 on its lower end. Also shown is a separate reconditioner 15 having a contact material feed conduit 16 connected into its upper end and a contact material drain conduit 20 connected into its lower end. Conveyors 17 and 18 are provided for transfer of the contact material particles between the convertor and reconditioner. The conveyors may be of any suitable construction adapted to transfer hot contact material particles without severe breakage and attrition of the particles, for example continuous bucket elevators. In operation, fresh contact material at a temperature suitable for the hydrocarbon conversion is passed from hopper 11 through feed leg 12 into the upper end of convertor 10. Used contact material is withdrawn from the bottom of the vessel 10 through conduit 13 at a rate controlled by valve 14 which is in conformance with the requirements of the particular conversion operation involved. The used contact material is transferred by conveyor 17 to the upper end of reconditioner 15. In such processes as the catalytic cracking conversion of hydrocarbons, a substantial amount of carbonaceous contaminant is deposited upon the used contact material in which case the reconditioner takes the form of a catalyst regenerator. Air is introduced into the lower section of vessel 15 through conduit 21 and is permitted to pass upwardly through the column of used contact material within vessel 15 to burn off the contaminant. Flue gas is withdrawn from the upper section of the vessel 15 through conduit 22. In order to remove sufficient heat from the regenerating catalyst to prevent overheating of the catalyst to heat damaging levels, cooling tubes (not shown) may be provided within the reconditioner. These tubes may be supplied with a suitable cooling fluid through pipe 23. Cooling fluid may be withdrawn from the cooling tubes through pipe 24. Other regenerator constructions than that shown and described hereinabove are contemplated within the scope of this invention. If the process involved is a strictly non-catalytic process, for example, in which the amount of coke deposit on the contact material is negligible or if it be a process wherein the amount of coke deposit on the contact material is insufficient upon combustion to heat the contact material to the desired inlet temperature to the convertor, the reconditioner 15 may take the form of an apparatus the principal function of which is to heat the contact material. Considering again the convertor 10, high boiling liquid hydrocarbons from a suitable charge preparation system 19 may be supplied in heated condition into the upper section of convertor 10 through conduit 25. In some operations vaporized hydrocarbons may be simultaneously supplied to the upper section of convertor 10 through conduit 26. Converted gaseous hydrocarbon products which may contain high percentages of motor and aviation gasoline and fuel oils are withdrawn from the lower section of vessel 10 and passed through conduit 27 to a suitable product fractionator and recovery system 28. An inert purge gas such as steam or flue gas may be introduced into the contact material column within the lower section of vessel 10 through conduit 29 for the purpose of stripping gaseous hydrocarbon products from the out flowing used contact material. An inert seal gas such as steam or flue gas may be introduced into the upper end of vessel 10 through conduit 30 at a rate so controlled by diaphragm valve 31 and differential pressure controller 32 as to maintain an inert gaseous pressure adjacent the lower end of contact material feed leg 12, above the gaseous pressure in the hydrocarbon conversion zone. In this manner escape of hydrocarbons through the contact material feed system is prevented.

In Figure 2, details of the construction of convertor 10 are shown and like elements in both figures bear like numerals. Looking at Figure 2, it will be seen that a partition 33 extends transversely across the upper section of vessel 10 to divide it into a seal chamber 34 positioned in its upper end and a conversion chamber 35 positioned therebelow. A conduit 36 for solid flow depends centrally and vertically from partition 33 and terminates within the upper section of the conversion chamber. Positioned centrally below the lower end of conduit 36 is a symmetrical upwardly tapered baffle 37 terminating on its upper end in an apex which is spaced shortly below the lower end of conduit 36. The baffle shown is an upright cone but baffles having other cross-sectional shapes such as square and hexagonal pyramids may be employed within the scope of this invention. In general the baffle 37 should be of the same horizontal cross-sectional shape as the conversion chamber but should be of substantially less horizontal cross-sectional area at its base than the conversion chamber at the level of the baffle. The baffle 37 may be supported from the vessel shell by means of rods 38.

Studying now Figures 2, 3, 4 and 5 together, a flow throttle device 40 is positioned below the lower end of conduit 36 and above the apex of baffle 37. This throttling device is constructed in the manner of an iris diaphragm, and is supported from the vessel shell by suspension from angle supports 41 and 42. The device is comprised of a fixed portion consisting of two concentric annular members, the outer member 41 fitting tightly around the inner member 42 and being fastened thereto by means of bolts 43. Corresponding recessed portions are provided around the joining edges of both members so that when they are joined there is provided a recessed annular opening or track 44 having a restricted neck portion 45. The inside diameter of the inner member 42 is substantially greater than that of conduit 36 so that the member 42 may fit loosely around the conduit 16 while providing a substantial gas space therebetween. An annular protruding section 46 extends downwardly from the base section of the inner member 42. This protruding section 46 serves as a fixed member onto which a plurality of overlapping diaphragm leaves 49 are loosely fulcrumed by means of bolts 47 at spaced points arranged concentrically with respect the axis of member 42. The leaves 49 are pivotally connected by means of bolts 50 to a movable annular ring 51 which is of somewhat greater diameter than the protruding section 46 of member 42. A T-shaped annular rail 52 protrudes from the upper edge of ring 51. The rail 52 is adapted to fit and slide loosely in the recessed track 44 formed between fixed members 41 and 42. A shaft 54 is connected to the outer periphery of the ring 51 and is provided with a horizontal bow shaped gear 55 on its outward end. A drive shaft 56 extends through packing gland 57 and through the shell of vessel 10. The shaft 56 is geared by means of gears 58, 59 and 60 and vertical shaft 61 to drive the bow shaped gear 55 on shaft 54 and thereby to actuate the ring 51. The ring 51 may be thus rotated back and forth around its vertical axis so as to cause the leaves 49 to provide a central circular iris opening 65 of varying size for solid material flow. The throttling device is so positioned that the iris opening is located just over the conical baffle and coaxially aligned therewith so that regardless of the size of the iris opening 65, the contact material from conduit 36 is directed evenly and centrally directed onto the apex of the baffle 37.

If desired a hand crank may be connected to shaft 56 outside the vessel 10 to permit manual adjustment of the throttling device 40. It is preferred however to provide automatic adjustment as will be described hereinbelow. It will be noted from Figure 2 that the surface level 70 of the contact material column within vessel 10 is maintained a substantial vertical distance below the base of conical baffle 37 so as to provide a vertical section 71 through which the contact material falls as a shower of dispersed freely falling particles. A spray device 73 adapted to spray liquid oil downwardly into the shower of contact material particles is positioned in section 71 of the converter just below baffle 37. Liquid oil charge is supplied to the spray device 73 through conduit 25. Two spaced apart electrical condenser plates, 75 and 76, held apart by insulators 77 are supported by suitable means (not shown) within vessel 10 so as to extend vertically along a short section of the vessel corresponding roughly to the range of levels within which it is desired to maintain the surface level 70 of the column of contact material within the conversion zone. Contact material fills in the space between the plates 75 and 76 and upon change in level causes a change in the dielectric resistance between the condenser plates. The plates are connected into a suitable A. C. bridge circuit 79 which may be of conventional type, and the plates act to set up varying currents in the bridge circuit in response to changes in the surface level of the column of contact material. A motor 80 is connected through a speed reducer 81 to the drive shaft 56 for the contact material flow throttling device 40. The bridge circuit 79 is adapted to operate the motor 80 in such a manner as to cause it to turn the shaft 56 in a direction which will decrease the iris opening 65 of device 40 when the surface 70 of the contact material column rises above a predetermined level and to increase the size of the iris opening 65 when the surface 70 of the column falls below said predetermined level. It will be understood that while the system described hereinabove for automatically adjusting throttling device 40 is a preferred form of the invention, it should be understood that it is contemplated that it may be replaced by other suitable systems adapted to adjust the size of iris opening 65 in response to changes in the surface level of the contact material column within the conversion zone.

In operation, particle form contact material existing at a temperature sufficiently high to support the desired hydrocarbon conversion passes as a substantially compact stream downwardly through conduit 36. The contact material flows from the lower end of conduit 36 into the throttling device 40 and passes through the iris opening 65 onto the apex of baffle 37. The baffle 37 serves to disperse the particles so that they fall downwardly through section 71 as a shower of uniformly dispersed, freely falling particles onto the surface 70 of the contact material column therebelow. A liquid oil charge which boils for the most part above the desired conversion temperature is introduced in heated condition through conduit 25 into spray device 73 by which it is sprayed onto the shower of particles so as to thoroughly contact the contact material before reaching the surface 70 of the column. If desired vaporized hydrocarbon charge may also be introduced into vessel 10 through conduit 26. The contact material particles and liquid charge and any vapors formed or introduced pass downwardly within the column so as to effect conversion of the liquid charge to lower boiling gaseous products which are disengaged from the column in the lower section of vessel 10 and removed through conduit 27. The gaseous products withdrawn at 27 may be disengaged from the column by any of a number of suitable arrangements such as that shown in Simpson et al. U. S. Patent 2,336,041, or troughs such as shown in Barstow et al. U. S. Patent 1,852,227, or troughs such as shown by Fahnestock, in U. S. Patent 2,362,621, may be associated with the outlet conduit 27. Used contact material is withdrawn from the lower end of vessel 10 through conduit 13. The rate of contact material withdrawal is throttled by valve 14 so as to insure a column of contact material in the vessel 10 thereabove and so as to control the residence time of contact material in the conversion zone to whatever value the particular operation involved requires.

Baffles may be provided within the lower end of vessel 10 which are adapted to provide for uniform withdrawal of contact material from all sections of the horizontal cross-sectional area of the conversion zone. Such baffles are shown in Evans et al., U. S. Patent 2,412,136. The conduit 36 for solid flow into the conversion chamber is of sufficient size as to have an unthrottled flow capacity above the maximum anticipated contact material throughput. As a result, if no throttle were applied to the flow from conduit 36 the contact material column would extend upwardly to the outlet from conduit 36. The provision of throttling device 40 permits the maintenance of the section 71 in which contact material may fall as a shower. In other words the throttling device 40 permits maintenance of level 70 of the column a spaced distance below baffle 37. In the space 71 the liquid oil charge may be uniformly adsorbed in the pores and/or deposited on the surface of the contact material particles so that it is carried on the particles uniformly onto all sections of the contact material column. In this manner the channeling of liquid charge in the column of contact material is avoided and uniform conversion conditions and uniform contaminant deposition on all of the contact material is made possible. It will be apparent that uniform dispersion of contact material particles to all portions of the horizontal cross-sectional area of section 71 depends on the delivery of the inlet contact material stream squarely and symmetrically onto the apex of the baffle 37 regardless of the rate of flow of contact material. Such delivery cannot be accomplished by means of conventional gate or slide valves over a various range of adjustable flow rates. The throttling device 40 constructed in the manner of an iris diaphragm, however, insures delivery of the contact material stream symmetrically onto the apex of baffle 37 over a wide range of flow rates. The iris opening 65 is always coaxially aligned with baffle 37 regardless of its size and is susceptible to fine adjustment from a point outside the vessel so as to permit accurate control of the level of the surface 70 of the contact material column spaced below baffle 37. Since the flow throttling device is so constructed as to permit access of gaseous pressure above and below the iris 65, its control on the rate of contact material flow is independent of pressure changes in the conversion vessel.

The exact dimensions of the several elements which combine to provide the improved apparatus of this invention will, of course, be dependent to a certain extent upon the particular operation and the operating conditions involved. In general it has been found desirable to provide a vertical distance of about ten feet between the base of the baffle 37 and the surface 70 of the contact material column. The surface 70 of the column should be maintained within a narrow range of levels falling within a vertical length of the vessel amounting to about 2 inches. The vertical length of the column may vary from about 3 to 40 feet depending upon the process. The base of the baffle 37 should be substantially less in horizontal dimensions than the vessel, and its sides should slope at an angle with the horizontal greater than about 30 degrees and preferably within the range 45 to 70 degrees. For example in a vessel having an internal diameter of 16 feet a cone having a base diameter of about 7 feet and a height of about 4 feet is considered satisfactory. The throttle device 40 should be positioned below conduit 36 in such a manner as to prevent overflow of contact material over the throttle device and it should be positioned so that the iris opening is within about 4 to 6 inches of the apex of baffle 37.

As an example of the application of this invention its use in the catalytic cracking conversion of high boiling fluid hydrocarbons may be considered. In such an operation a particle form catalyst which may be of clay type is introduced into the conversion chamber at a temperature within the range about 900 to 1200° F. depending upon the desired conversion temperature, the clay to oil ratio and the particular hydrocarbon charge involved and the desired products. A liquid hydrocarbon charge which may consist principally of hydrocarbons boiling above the desired average conversion temperature is introduced through pipe 49. Such a charge may be a reduced petroleum crude which has been preheated to a temperature of the order of 600° F. to 800° F. A gas oil fraction which has been vaporized and heated to a temperature of the order of 800° F. to 950° F. may be introduced to the conversion chamber through conduit 50. Gaseous products containing high yields of gasoline may be withdrawn from the conversion chamber through conduits 53 and 54. The pressure in the conversion chamber may be controlled quite low, usually of the order of 5 to 30 pounds per square inch gauge. The total oil space velocity (measured as liquid oil at 60° F.) may be within the range about 0.5 to 10 volumes of oil per volume of flowing catalyst in the conversion zone. The relative ratio of liquid to gaseous hydrocarbon charge may vary widely depending upon specific refinery stock conditions. The catalyst to oil ratio on the weight basis may be within the range about 2.0 to 20 parts of catalyst charged per part of oil. In the regeneration zone air may be employed to burn from the catalyst the carbonaceous contaminant formed thereon in the conversion zone. Sufficient heat should be withdrawn from the catalyst during regeneration to prevent it from reaching a heat damaging temperature. For clay type catalysts the heat damaging level is of the order of about 1200° F.

It should be understood that the particular details of apparatus construction and of operating conditions and of process applications of this invention given hereinabove are intended as illustrative and are not to be construed as limiting the scope of this invention except as it may be limited by the following claims.

I claim:
1. A method for conversion of high boiling liquid hydrocarbons to lower boiling hydrocarbons in the presence of a moving contact material which method comprises: introducing particle-form contact material at a suitable temperature for said hydrocarbon conversion into the upper section of a confined, elongated, substantially vertical conversion zone as a substantially compact supply stream of solid particles, passing the contact material from said stream downwardly through an upper section of said conversion zone as a shower of dispersed freely falling particles onto the surface of a substantially compact bed of said contact material therebelow within said conversion zone, withdrawing used contact material from the bottom of said bed, controlling the surface level of said bed substantially constant by adjusting the rate of flow of contact material from said compact supply stream, introducing a spray of high boiling liquid hydrocarbon charge into said shower of particles in said upper section of said conversion zone to contact said particles before reaching the surface of said bed, and withdrawing gaseous hydrocarbon products from the lower section of said bed substantially separately of said contact material.

2. A method for conversion of high boiling liquid hydrocarbons to lower boiling hydrocarbons in the presence of a moving contact material which method comprises: introducing particle-form contact material at a suitable temperature for said hydrocarbon conversion into the upper section of a confined, elongated, substantially vertical conversion zone as a substantially compact supply stream of solid particles, baffling the flow of particles from said stream to disperse the particles and passing the dispersed particles as a shower of freely falling particles downwardly through a vertical section of said conversion zone onto the surface of a substantially compact column of said contact material at a lower level in said conversion zone, spraying a heated high boiling liquid hydrocarbon charge into said shower to contact said particles before reaching the surface of said column, passing said contact material particles and said liquid hydrocarbon charge downwardly within said column to effect conversion of said liquid hydrocarbons to lower boiling gaseous hydrocarbon products, withdrawing used contact material from the lower section of said column, withdrawing gaseous hydrocarbon products from said column substantially separately of the contact material and controlling the level of the surface of said column substantially constant by adjustably throttling the flow of contact material from said compact supply stream at a location adjacent its lower end.

3. A method for conversion of high boiling liquid hydrocarbons to lower boiling hydrocarbons in the presence of a moving contact material which method comprises: introducing particle form contact material at a suitable temperature for said hydrocarbon conversion into the upper section of a confined, elongated, substantialy vertical conversion zone as a substantially compact supply stream of solid particles, baffling the flow of particles from said stream to disperse the particles and passing the dispersed particles as a shower of freely falling particles downwardly through a vertical section of said conversion zone onto the surface of a substantially compact column of said contact material at a lower level in said conversion zone, spraying a heated high boiling liquid hydrocarbon charge into said shower to contact said particles before reaching the surface of said column, passing said contact material particles and said liquid hydrocarbon charge downwardly within said column to effect conversion of said liquid hydrocarbons to lower boiling gaseous hydrocarbon products, withdrawing used contact material from the lower section of said column, withdrawing gaseous hydrocarbon products from said column substantially separately of the contact material, throttling the flow of contact material from said compact supply stream at a point near the lower end of said stream and above said baffling and causing the throttling of the flow from said compact supply stream to be adjusted by changes in the surface level of said column in such a manner as to control the surface level of said column within a narrow range of levels all spaced substantially below the location at which the flow of contact material from said supply stream is subjected to the baffling.

4. A method for conversion of high boiling liquid hydrocarbons to lower boiling hydrocarbons in the presence of a moving contact material which method comprises: introducing particle form contact material at a suitable temperature for said hydrocarbon conversion into the upper section of a confined, elongated, substantially vertical conversion zone as a substantially compact supply stream of solid particles, baffling the flow of particles from said stream to disperse the particles and passing the dispersed particles as a shower of freely falling particles downwardly through a vertical section of said conversion zone onto the surface of a substantially compact column of said contact material at a lower level in said conversion zone, spraying a heated high boiling liquid hydrocarbon charge into said shower to contact said particles before reaching the surface of said column, passing said contact material particles and said liquid hydrocarbon charge downwardly within said column to effect conversion of said liquid hydrocarbon to lower boiling gaseous hydrocarbon products, withdrawing used contact material from the lower section of said column, withdrawing gaseous hydrocarbon products from said column substantially separately of the contact material and controlling the level of the surface of said column substantially constant by adjustably restricting the diameter of said compact supply stream at a location adjacent its lower end in such a manner that the restricted portion of said stream is always coaxially aligned with the unrestricted portion of said compact stream above the location of diameter restrictions.

5. The method for conversion of high boiling liquid hydrocarbons to lower gaseous boiling hydrocarbon products in the presence of a moving particle form solid contact mass material which method comprises: maintaining a substantially compact bed of particle form contact material in a confined seal zone, supplying contact material to said bed at a temperature suitable for supporting conversion of said liquid hydrocarbons, passing contact material from the lower section of said bed as a substantially compact confined stream downwardly into the upper section of an elongated confined conversion zone, baffling the flow of particles from said stream to disperse the particles and passing the dispersed particles as a shower of freely falling particles downwardly through a vertical section of said conversion zone onto the surface of a substantially compact column of said contact material at a lower level in said conversion zone, spraying a heated high boiling liquid hydrocarbon charge into said shower to contact said particles before reaching the surface of said column, passing said contact material particles and said liquid hydrocarbon charge downwardly within said column to effect conversion of said liquid hydrocarbons to lower boiling gaseous hydrocarbon products, withdrawing used contact material from the lower section of said column, withdrawing gaseous hydrocarbon products from said column substantially separately of the contact material and controlling the level of the surface of said column substantially constant by adjustably throttling the flow of contact material from said compact supply stream at a location adjacent its lower end, and maintaining an inert gaseous pressure in said seal zone above the gaseous pressure in said conversion zone.

6. An apparatus for conversion of high boiling liquid hydrocarbons to lower boiling gaseous hydrocarbons in the presence of a moving contact mass material which comprises in combination: means defining a conversion chamber, a conduit extending downwardly into the upper section of said chamber for supply of contact material, an upwardly tapered symmetrical baffle terminating in an apex positioned within the upper section of said chamber with its apex a spaced distance below the lower end of said conduit, said baffle being of substantially less cross-sectional area at its base than said chamber, a flow throttling device positioned between said conduit and said baffle, said throttling device being constructed substantially in the manner of an iris diaphragm and being so positioned as to provide an adjustable iris opening for solid flow which is coaxialy aligned with said baffle, means to adjust the iris opening of said throttling device from a location outside of said chamber, means to withdraw contact material from the lower end of said chamber, means to spray liquid oil charge into said chamber below said baffle and means to withdraw gaseous hydrocarbon products from the lower section of said chamber substantially separately of said contact material.

7. An apparatus for conversion of high boiling liquid hydrocarbons to lower boiling gaseous hydrocarbons in the presence of a moving contact mass material which comprises in combination: means defining a conversion chamber adapted to confine a substantially compact column of particle form contact material, a conduit extending downwardly into the upper section of said chamber for supply of contact material, an upwardly tapered symmetrical baffle terminating in an apex positioned within the upper section of said chamber with its apex a spaced distance below the lower end of said conduit, said baffle being of substantially less cross-sectional area at its base than said chamber, a flow throttling device positioned between said conduit and said baffle, said throttling device being constructed substantially in the manner of an iris diaphragm and being so positioned as to provide an adjustable iris opening for solid flow which is coaxially aligned with said baffle, a level measuring device positioned within said chamber a spaced distance below said baffle adapted to measure the surface level of the contact material column in said chamber, mechanism actuated by said measuring device adapted to adjust said flow throttling device in response to changes in the surface level of said column in such a manner as to maintain said surface level of said column within a narrow range of levels all spaced substantially below said baffle, means to withdraw contact material from the lower end of said chamber, means to spray liquid oil charge into said chamber below said baffle and means to withdraw gaseous hydrocarbon products from the lower section of said chamber substantially separately of said contact material.

8. An apparatus for conversion of high boiling liquid hydrocarbons to lower boiling gaseous hydrocarbons in the presence of a moving contact mass material which comprises in combination: means defining a conversion chamber adapted to confine a substantially compact column of particle form contact material and gaseous material under pressure, a conduit extending downwardly into the upper section of said chamber for supply of contact material, an upwardly tapered symmetrical baffle terminating in an apex positioned within the upper section of said chamber with its apex a spaced distance below the lower end of said conduit, said baffle being of substantially less cross-sectional area at its base than said chamber, a flow throttling device positioned between said conduit and said baffle, said throttling device comprising a plurality of laterally overlapping diaphragm leaves each fulcrumed to a stationary member and each pivotally connected to an annular actuator in such a manner as to provide an adjustable iris opening which is coaxially aligned with respect said upwardly tapered baffle, operating means connected to the annular actuator of said flow throttling device and extending through the shell of said chamber to permit adjustment of said throttling device from outside of said chamber, a drive mechanism adapted to drive said operating means upon suitable activation, a level measuring device positioned within said chamber a spaced distance below said tapered baffle adapted to activate said drive mechanism in response to changes in surface level of the contact material column within the level range of said measuring device, means to withdraw contact material from the lower section of said chamber, a liquid spray device positioned below said tapered baffle, means to supply liquid hydrocarbon charge to said spray device and means to withdraw gaseous products from the lower section of said chamber.

9. Apparatus for conversion of high boiling liquid hydrocarbons to lower boiling gaseous hydrocarbons in the presence of a moving particle form contact mass material which apparatus comprises in combination: means defining an elongated conversion chamber adapted to confine a substantially compact column of contact material particles and gaseous material, a contact material supply conduit extending substantially vertically and centrally into the upper section of said conversion chamber, a symmetrical upwardly tapered baffle terminating in an apex positioned symmetrically below the lower end of said conduit, said baffle being of substantially less cross-sectional area at its base than said chamber, a flow throttling device positioned shortly above the apex of said baffle and coaxially with respect to said conduit and said tapered baffle, said throttling device comprising a plurality of laterally overlapping diaphragm leaves having curved edges, said leaves being loosely fulcrumed to a stationary member and said leaves being pivotally connected to an actuating ring in such a manner as to provide an adjustable iris opening for solid flow, a level measuring device extending along a vertical section of said chamber a spaced distance below the base of said baffle, mechanism actuated by said measuring device adapted to adjust said flow throttling device in response to changes in the surface level of said column in such a manner as to maintain said surface level of said column within a narrow range of levels all spaced substantially below said baffle, means to withdraw contact material from the lower end of said chamber, means to spray liquid oil charge into said chamber below said baffle and means to withdraw gaseous hydrocarbon products from the lower section of said chamber substantially separately of said contact material.

10. An apparatus for conversion of high boiling liquid hydrocarbons to lower boiling gaseous hydrocarbons in the presence of a moving contact mass material which comprises in combination: a substantially vertical elongated vessel, partitioning across the upper section of said vessel adapted to divide it into an upper seal chamber and a lower conversion chamber, means to introduce contact material into said seal chamber, means to introduce a seal gas into said seal chamber, a conduit depending centrally and vertically downwardly from said partition and terminating within the upper section of said conversion chamber, an upright conical baffle positioned within said conversion chamber so that the apex of said baffle is centrally positioned shortly below the lower end of said conduit, said conical baffle being of substantially less cross-sectional area at its base than said conversion chamber, a flow throttling device constructed to operate as an iris diaphragm positioned above said conical baffle so that its iris opening is centrally positioned over the apex of said cone and below the lower end of said conduit, adjusting means adapted for adjusting said flow throttling device in response to changes in the level of a contact material column in said conversion zone, means to withdraw contact material from the lower end of said vessel, a liquid spray device positioned in said vessel below said conical baffle, and means to withdraw gaseous material from the lower section of said conversion chamber.

11. Apparatus for conversion of high boiling liquid hydrocarbons to lower boiling gaseous hydrocarbons in the presence of a moving particle form contact mass material which apparatus comprises in combination: means defining an elongated conversion chamber adapted to confine a substantially compact column of contact material particles and gaseous material, a contact material supply conduit extending substantially vertically and centrally into the upper section of said conversion chamber, a symmetrical upwardly tapered baffle terminating in an apex positioned symmetrically below the lower end of said conduit, said baffle being of substantially less cross-sectional area at its base than said chamber, a flow throttling device positioned shortly above the apex of said baffle and coaxially with respect to said conduit and said tapered baffle, said throttling device comprising a plurality of laterally overlapping diaphagm leaves having curved edges, said leaves being loosely fulcrumed to a stationary member and said leaves being pivotally connected to an actuating ring in such a manner as to provide an adjustable iris opening for solid flow, means connected to said ring adapted to permit adjustment of said flow throttling device from a location outside of said vessel, a liquid spray device adapted to spray liquid downwardly in said chamber positioned below said tapered baffle, means to supply liquid oil charge to said spray device, means to withdraw gaseous products from the lower section of said chamber and means to withdraw used contact material from the lower end of said chamber substantially uniformly from all portions of its horizontal cross-sectional area.

WILLIAM A. HAGERBAUMER.

REFERENCES CITED

The following references are of record in the file of this patent:

UNITED STATES PATENTS

| Number | Name | Date |
|---|---|---|
| 1,836,325 | James | Dec. 15, 1931 |

OTHER REFERENCES

Noll et al., "Houdry Pioneer," vol. 2, No. 1, October 1946 (8 pages).